United States Patent [19]
Rageot

[11] Patent Number: 6,137,940
[45] Date of Patent: Oct. 24, 2000

[54] REEL OF OPTICAL FIBER

[75] Inventor: Alain Rageot, Vigneux, France

[73] Assignee: Alcatel, Paris, France

[21] Appl. No.: 09/195,605

[22] Filed: Nov. 19, 1998

[30] Foreign Application Priority Data

Nov. 20, 1997 [FR] France .................................. 97 14566

[51] Int. Cl.$^7$ .................................................. G02B 6/36
[52] U.S. Cl. ......................... 385/134; 385/147; 385/137
[58] Field of Search .................................... 385/134, 135, 385/136, 137, 147, 100, 115, 123

[56] References Cited

U.S. PATENT DOCUMENTS

| | | |
|---|---|---|
| 5,220,632 | 6/1993 | LoStracco . |
| 5,594,829 | 1/1997 | LoStracco et al. ...................... 385/134 |
| 5,710,853 | 1/1998 | Von Hoessle et al. .................. 385/123 |

FOREIGN PATENT DOCUMENTS

| | | |
|---|---|---|
| 0 499 000 A1 | 8/1992 | European Pat. Off. . |
| 0 747 741 A2 | 12/1996 | European Pat. Off. . |
| 0 747 742 A2 | 12/1996 | European Pat. Off. . |
| WO 90/10244 | 9/1990 | WIPO . |

*Primary Examiner*—Frank G. Font
*Assistant Examiner*—Layla Lauchman
*Attorney, Agent, or Firm*—Sughrue, Mion, Zinn, Macpeak & Seas, PLLC

[57] ABSTRACT

A reel of optical fiber comprising a supporting former and a coil made up of a plurality of superposed layers of touching turns of an optical fiber, a link layer made of a flexible material being disposed directly on the supporting former between said former and said coil, wherein an intermediate support made up of a winding of a plurality of layers of the same optical fiber as that of said coil, and wound in the same way, but with the turns glued together with a glue having strong adhesive power, is further situated between said coil and said flexible link layer.

4 Claims, 1 Drawing Sheet

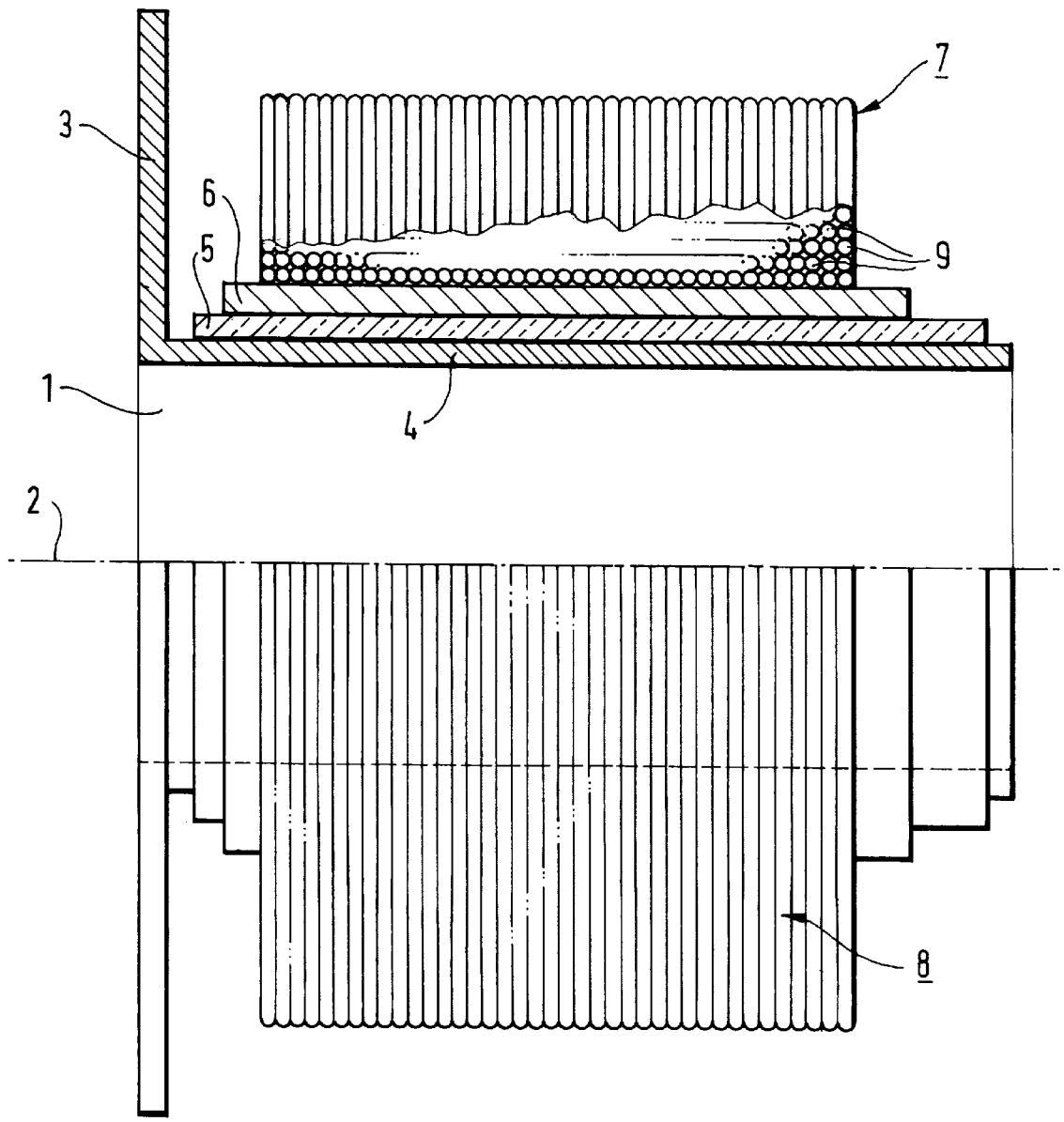

REEL OF OPTICAL FIBER

The present invention relates to a reel of optical fiber.

BACKGROUND OF THE INVENTION

Storing a long length of optical fiber on a supporting former raises the problem of differential expansion between the supporting former and the coil of optical fiber. The coil has a coefficient of axial expansion (expansion along the axis of the supporting former) that is much higher than its coefficient of radial expansion (in the direction of increasing circumferential length of the turns). An optical fiber is made up of a silica portion comprising the core and the cladding of the fiber, which portion has a coefficient of expansion $\alpha_1=5\times10^{-6}$ and is protected by a covering having a coefficient of expansion $\alpha_2=$ in the range $100\times10^{-6}$ to $900\times10^{-6}$ depending on temperature.

Thus, in the axial direction of the fiber, the much higher modulus of the silica restrains the expansion of the covering and limits the longitudinal expansion thereof to the longitudinal expansion of silica, i.e. to about $5\times10^{-6}$.

In the radial direction of the fiber, the expansion of the silica and of the covering in combination gives an overall coefficient approximately in the range $50\times10^{-6}$ to $450\times10^{-6}$.

Thus, once the fiber is wound on the supporting former, the coefficient of axial expansion of the coil is in the range $50\times10^{-6}$ to $450\times10^{-6}$, while its coefficient of radial expansion is $5\times10^{-6}$. These coefficients of expansion are to be compared, for example, with the coefficient of expansion of a supporting former made of aluminum. For such a supporting former, the coefficient of expansion is $24\times10^{-6}$ both axially and radially.

During temperature variations, the stresses induced by these various values for the coefficients of thermal expansion are sufficient to displace the turns of the coil relative to one another, and to destroy the coil which can then no longer be paid out rapidly without breaking the fiber.

European Document No. 0 747 741 describes a reel of optical fiber in which the problem is solved by means of a thermal expansion matching layer situated between the supporting former and the bundle constituting the coil of optical fiber. That layer is made of an elastomer material, such as silicone, for example, or else it is made of a composite material made of a soft elastomer matrix into which hard and rigid fibers are inserted, such as glass fibers or carbon fibers oriented in the circumferential direction of the supporting former.

Unfortunately, that matching layer, which is in direct contact with the optical fiber coil, can cause stresses in the coil during temperature variations.

OBJECT AND SUMMARY OF THE INVENTION

An object of the present invention is to provide a reel of optical fiber which can be stored under temperature conditions that vary very widely: from $-55°$ C. to $+77°$ C., which can be paid out at high speed, and which withstands high acceleration without its characteristics being degraded.

The invention provides a reel of optical fiber comprising a supporting former and a coil made up of a plurality of superposed layers of touching turns of an optical fiber, a link layer made of a flexible material being disposed directly on the supporting former between said former and said coil, wherein an intermediate support made up of a winding of a plurality of layers of the same optical fiber as that of said coil, and wound in the same way, but with the turns glued together with a glue having strong adhesive power, is further situated between said coil and said flexible link layer.

BRIEF DESCRIPTION OF THE DRAWING

The invention is described below with reference to the sole FIGURE of the accompanying drawing.

The FIGURE is a diagrammatic view in axial half-section showing a reel of optical fiber of the invention.

MORE DETAILED DESCRIPTION

The reel includes a supporting former 1 that is circularly symmetrical about an axis 2 and that is cylindrical or slightly frustoconical, i.e. frustoconical by a few degrees, e.g. in the range $1°$ to $5°$, thereby facilitating paying out the fiber rapidly by applying traction parallel to the axis 2.

The supporting former is provided with a system 3 enabling it to be fixed, e.g. in a transport vehicle. For example, the former 1 may be made of aluminum having a coefficient of expansion equal to $24\times10^{-6}$.

A flexible link layer 5 made of elastomer, e.g. made of silicone is situated on the hub 4 of the former 1.

An intermediate support 6 whose structure is explained below is disposed around the link layer 5.

Finally, the coil 7 of optical fiber 8 is disposed around the intermediate support 6. The coil is constituted by a multi-layer winding having touching turns 9. The fiber is wound with a coating of a small of quantity of a weak binder that enables a coil constituting a cohesive bundle to be obtained, but that in no way prevents the reel from being paid out rapidly. The bundle constituting the coil 7 of optical fiber has a coefficient of radial expansion (expansion perpendicular to the axis 2) $\alpha_1=5\times10^{-6}$ and a coefficient of axial expansion (expansion in the direction of the axis 2) $\alpha_2=50\times10^{-6}$ to $450\times10^{-6}$.

The intermediate support 6 is made up of a winding of a plurality of touching turns of the same type as the coil 7 and wound in the same way, but with the turns being glued together very strongly, e.g. with an epoxy glue. An intermediate support 6 is thus obtained that constitutes a solid bundle that has coefficients of radial expansion and of axial expansion identical to those of the coil of optical fiber 7, and that is subjected to the stresses caused by the expansion differences between it and the link layer 5, thereby isolating the coil 7 completely from such stresses. These stresses to which the intermediate support 6 is subjected have no serious consequences because the support is made up of a winding of optical fiber that is never paid out.

Furthermore, the link layer 5 is thick enough to compensate for the expansion differences between the supporting former 1 made of aluminum and the intermediate support 6.

The reel of the invention is cheap and easy to make, it enables the fiber to be paid out rapidly with no difficulty and with no risk of the fiber breaking, by means of the good stability of the coil during storage over long periods during which large variations in temperature can occur. The good mechanical bonding between the supporting former, the link layer, the intermediate support, and the coil, enable the reel to withstand high acceleration without the various components coming apart.

What is claimed is:

1. A reel of optical fiber comprising a supporting former and a coil made up of a plurality of superposed layers of touching turns of an optical fiber, a link layer made of a flexible material being disposed directly on the supporting former between said former and said coil, wherein an intermediate support made up of a winding of a plurality of layers of the same optical fiber as that of said coil, and wound in the same way, but with the turns glued together with a glue having strong adhesive power, is further situated between said coil and said flexible link layer.

2. A reel according to claim 1, wherein said link layer is a layer of silicone.

3. A reel according to claim 1, wherein said supporting former is made of metal.

4. A reel according to claim 1, wherein said glue is an epoxy glue.

* * * * *